(12) United States Patent
Backus et al.

(10) Patent No.: US 6,578,470 B2
(45) Date of Patent: Jun. 17, 2003

(54) FOOD INJECTION DEVICE

(76) Inventors: Alan L. Backus, 1660 Bel Air Rd., Los Angeles, CA (US) 90077; Ron Popeil, 1292 Monte Cielo Dr., Beverly Hills, CA (US) 90210

( * ) Notice: Subject to any disclaimer, the term of this patent is extended or adjusted under 35 U.S.C. 154(b) by 0 days.

(21) Appl. No.: 09/891,915

(22) Filed: Jun. 26, 2001

(65) Prior Publication Data

US 2002/0195003 A1 Dec. 26, 2002

(51) Int. Cl.$^7$ .............................. A23L 1/00; A23L 1/22
(52) U.S. Cl. ...................... 99/345; 99/494; 99/450.7; 426/281; 426/282
(58) Field of Search .......................... 99/345, 494, 532, 99/450.7, 533; 141/21, 25, 26, 352, 357; 222/209, 213, 215; 604/187, 218, 220, 221, 222, 227; 426/281, 282, 92, 102, 89, 518

(56) References Cited

U.S. PATENT DOCUMENTS

| | | | |
|---|---|---|---|
| 390,170 A | 9/1888 | Humaston | |
| 774,394 A | 11/1904 | Peter | |
| 916,441 A | 3/1909 | Hachmann | |
| 921,980 A | 5/1909 | Hackmann et al. | |
| 1,155,139 A | * 9/1915 | Felker | 99/494 |
| 1,883,829 A | 10/1932 | Skoverski | |
| 1,917,137 A | 7/1933 | Marchio | |
| 2,118,976 A | 5/1938 | Larkin | |
| 2,124,700 A | 7/1938 | Hartzell | |
| 2,473,191 A | 6/1949 | Bettencourt | |
| 2,776,634 A | 1/1957 | Morton | |
| 2,784,682 A | * 3/1957 | Clevenger | 99/494 |
| 2,822,571 A | 2/1958 | Johnson | |
| 3,161,154 A | 12/1964 | Schott | |
| 3,241,477 A | 3/1966 | Jenner | |
| 3,483,810 A | 12/1969 | Peters et al. | |
| 3,754,469 A | 8/1973 | Gaisor | |
| 4,064,879 A | * 12/1977 | Leibinsohn | 604/218 |
| 4,178,660 A | 12/1979 | Olney et al. | |
| 4,211,160 A | 7/1980 | Bieser | |
| 4,258,067 A | 3/1981 | Stoll et al. | |
| 4,414,885 A | 11/1983 | Kelly | |
| 4,455,928 A | 6/1984 | Townsend | 99/533 |
| 4,641,573 A | 2/1987 | Gunn | |
| 4,703,688 A | * 11/1987 | Ochs | 99/494 X |
| 4,729,589 A | 3/1988 | Puskar | |
| 5,226,897 A | * 7/1993 | Nevens et al. | 604/218 |
| 5,275,095 A | 1/1994 | Van Haren | 99/533 |
| 5,453,044 A | 9/1995 | Abler et al. | |
| 5,881,640 A | 3/1999 | Rævsager | 99/533 |
| 5,900,265 A | 5/1999 | Rutherford | |
| 6,117,467 A | * 9/2000 | Huling | 99/345 X |

FOREIGN PATENT DOCUMENTS

JP         63-202345         8/1988

* cited by examiner

Primary Examiner—Reginald L. Alexander
(74) Attorney, Agent, or Firm—Christie, Parker & Hale, LLP (57) ABSTRACT

A device to inject solid materials into foods and other objects. The device utilizes a hollow needle with a moving cover at one end. A plunger moves inside the hollow needle to push contents from the needle into the object to be injected. Various apparatus for moving the can be utilized.

12 Claims, 7 Drawing Sheets

FOOD INJECTION DEVICE

FIELD OF THE INVENTION

The present inventions are directed primarily toward food preparation devices and particularly toward devices which inject substances into foods.

BACKGROUND OF THE INVENTION

It is common today for cooks in homes, bakeries and restaurants to use hypodermic type needles to inject marinades, flavorings and other liquid substances into meats and other food products. Such devices are also commonly used to inject more viscous liquids and semi liquids such as jellies, frostings, puddings, into such foods as cakes, cream puffs, eclairs and cupcakes. Typically these devices resemble oversized medical hypodermic syringes which the cook fills through the back of the barrel and hand operates by pushing a plunger. These devices allow flavorings to penetrate inside and throughout the food and provide foods with a moistness, texture, and/or taste they might otherwise lack.

Commercial food injection devices have also been in common use for many years. Like their home and restaurant counterparts, these devices typically use hollow needles inserted into the food to inject liquids and semi liquid substances. Their applications include not only injecting flavorings and food substances such as already mentioned, but also liquid and semi liquid substances to increase food weight, decrease spoilage, and help in processing. Three such commercial food injection devices are shown in U.S. Pat. No. 4,455,928, Townsend—Means for Injecting Fluids Into Food Products; U.S. Pat. No. 5,275,095, Van Haren—Brine Injection Device; U.S. Pat. No. 5,881,640, Raevsager—Apparatus for Injecting Brine Into Food Products.

All the aforementioned devices are limited to injecting liquids and semi liquids. Solid materials such as dried spices, salt, sugar, sunflower seeds, peanuts, garlic cloves, chunks of pineapple, jellybeans, chunky peanut butter, etc. cannot be injected using any of these devices.

It would be useful to have a mechanism which could inject solid substances such as just mentioned into foods. Such a device also might find wider use in medical and other settings.

As examples, whole peanuts could be injected into sesame rolls, or pineapple chunks injected into hams, or garlic cloves injected into a pot roast, or jellybeans injected into frosted cupcakes, or lemon chunks injected into rotisserie cooked chicken, or walnuts injected into roast beef, or ice cream injected into angel food cake, etc.

SUMMARY OF THE INVENTION

Several embodiments of the present inventions are illustrated in the appended figures. In brief, all embodiments comprise four interrelated sections: the injection needle, the solid material mover, the power drive, and the material loading mechanism.

Starting with the injection needle, embodiments as illustrated in FIGS. 1 through 7, show two alternative constructions 20 and 22, both having needles 21 and 23, ending in penetrating points 24 and 26, and both having movable port covers, shown respectively as 28 and 30, to cover respectively injected solid exits 32 and 34. Penetrating points 24 and 26 allow piercing into the object to be injected. Movable port covers 28 and 30 may serve either and/or both the purpose or purposes of structurally supporting penetrating points 24 and 26, and/or restraining materials to be injected from leaving the needle until the materials are driven out by the solid material mover.

In the embodiments as illustrated in FIGS. 1 through 7, the solid material mover comprises plunger 36 which slides into and out of needle 21 or needle 23 and thus pushes solids out respectively through food injected solid exits 32 or 34 covered by respectively movable port cover 28 and 30.

In turn, plunger 36 is pushed into needle 21 or 23 by the power drive mechanism comprising pusher plunger 38 which slides inside of barrel 40 driven by manual pressure.

Figure 8:
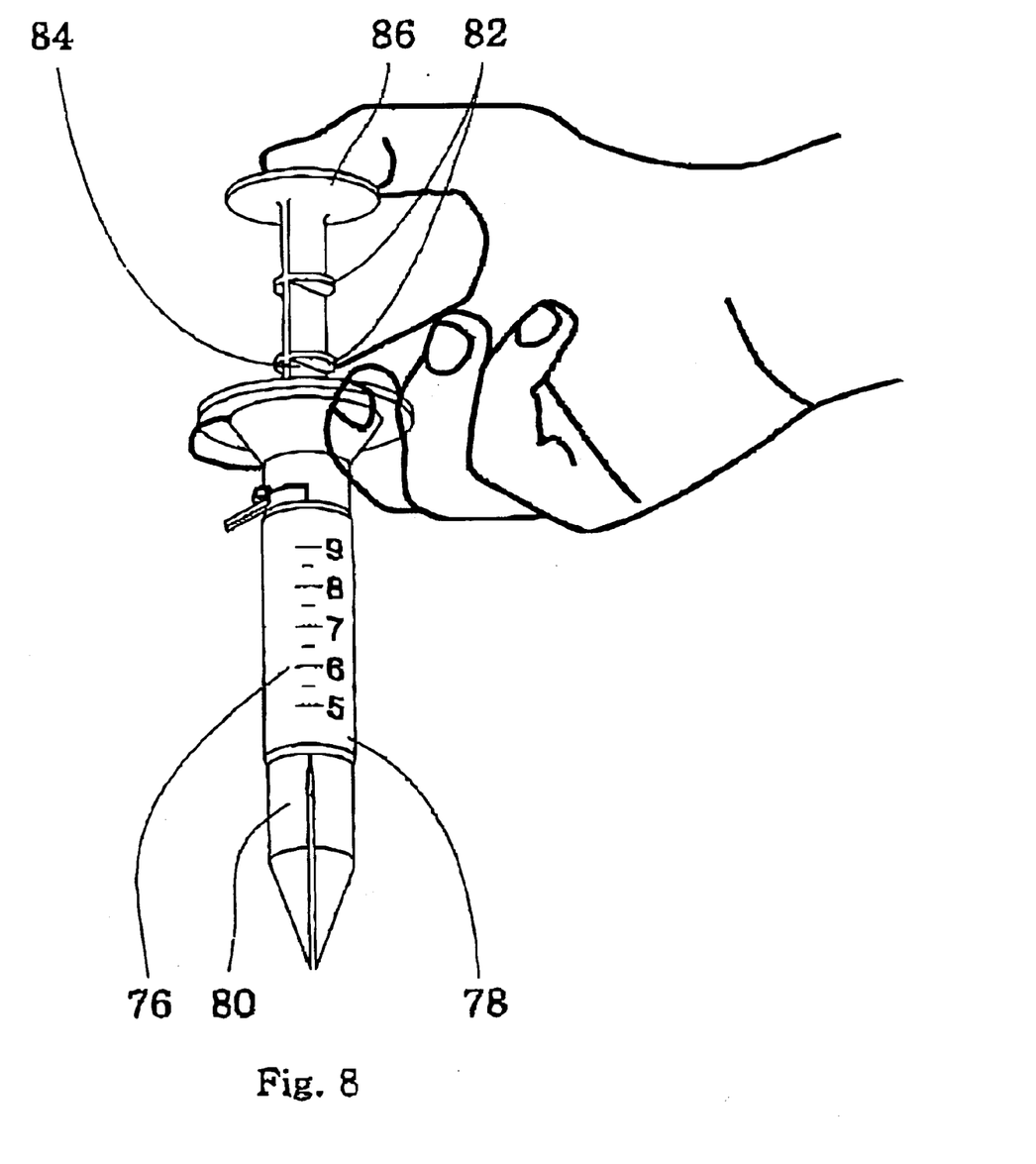
FIG. 8 is a perspective view of an alternative embodiment of the present inventions which eliminates the need for pusher plunger 30, barrel 40 and needle ring securing nut 54.

FIG. 8 shows another configuration for the power drive mechanism comprising direct manual pressure on plunger 84. This eliminates the need for pusher plunger 38, barrel 40 and needle ring securing nut 54.

Other configurations for the power drive mechanism might also be employed. As examples, a solenoid drive such as used in electric staple guns, or a powered screw drive mechanism such as used in electric cookie presses, or a ratcheted screw drive mechanism such as used in electric caulking guns, or a flexible shaft drive such as used in orthopedic surgical equipment might also be used to replace the mechanism previously described.

Figure 9:
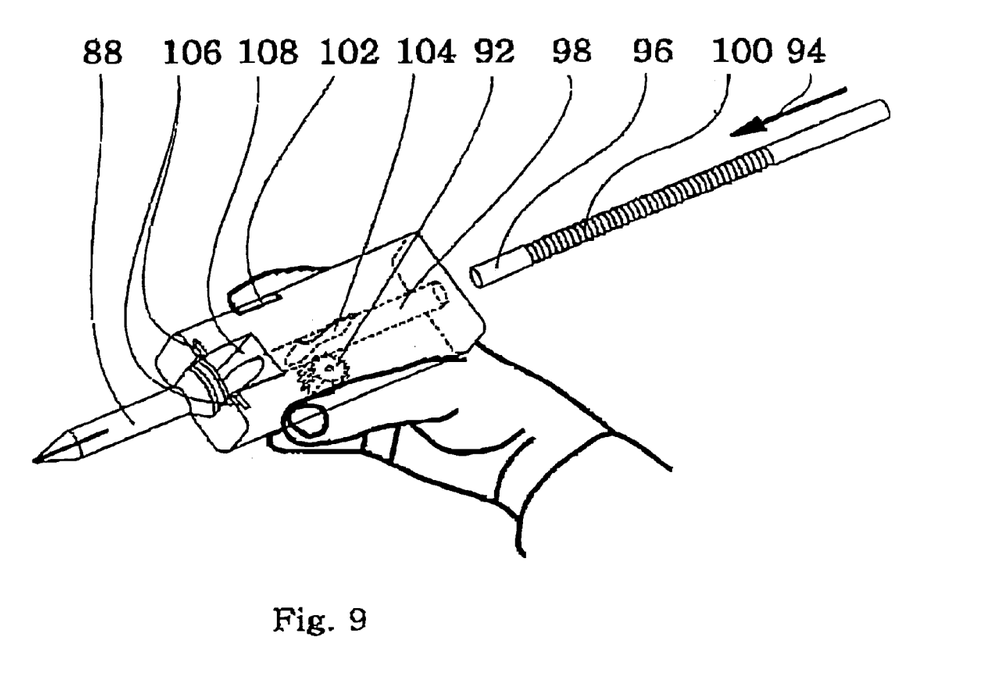
FIG. 9 shows a motorized embodiment of the present inventions.

One example of a motor drive is illustrated in FIG. 9. As already described, this embodiment uses a gear reduced electric motor to drive a plunger which pushes material to be injected out of the injection needle and into the object to be injected.

In the embodiments shown in FIGS. 1 through 7, the material loading mechanism comprises placing solids to be injected into needle 21 through opening 42 or into needle 23 through opening 44. Openings 42 and 44 are opposite respectively penetrating points 24 and 26 on their respective needles 21 and 23. In the example shown in FIG. 1 needle 21 or 23 must first be removed from barrel 40 by unscrewing needle ring securing nut 54 before materials may be loaded through openings 42 or 44. Alternatively, pusher plunger 38 and plunger 36 may be backed out of barrel 40 and materials to be injected may be dropped into the back of barrel 40 where they may drop by gravity into needle 21 or needle 23. Plunger 36 and pusher plunger 38 would then be reinserted into barrel 40.

Alternatively, the material loading mechanism may comprise splitting 46 needle 21 or splitting 48 needle 23 and hinging a portion of each needle so that the unhinged portion could dip into and scoop up solids and semi solids to be injected. This dipping and scooping is similar to a spoon scooping up material. After dipping, scooping and filling the needle, the hinged portion of the needle would be swung back into place and secured, as an example, by sliding ring 50 or 52 respectively over needle 21 or 23, and plunger 36 driven by the power drive mechanism would push the solids or semi solids out respectively through injected solid exits 32 or 34. Ring 50 or 52 could be held in place on their respective needles 21 and 23 by friction or by a small protrusion sliding over an indented groove to make a snap fit. Such snap fits are well known in the art and thus are not described in detail herein.

Figure 3:
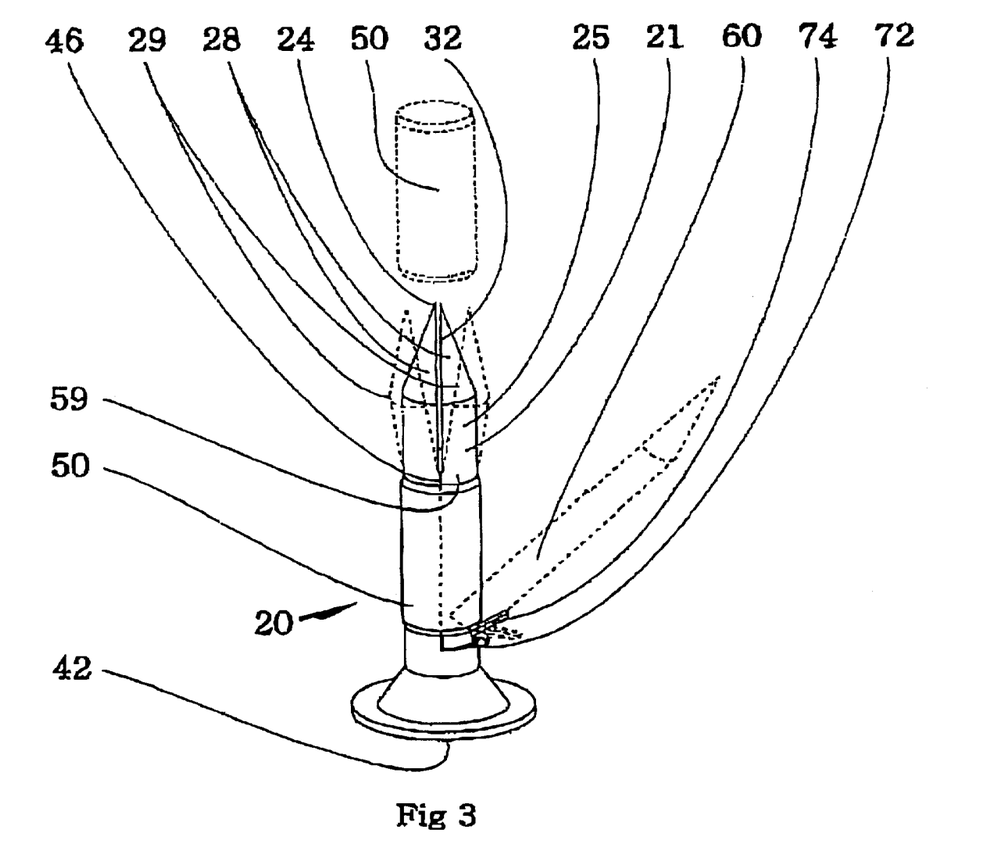
FIG. 3 is a perspective side view of needle 21.

To make operation easier of the material loading mechanism just described, hinge 72 might be biased so hinged needle portion 60 naturally springs outward as shown in FIG. 3 when ring 50 is removed from needle 21. This would mean needle 21 would be naturally open for scooping when ring 50 was removed. Alternatively, or in conjunction with the above, finger lever 74 attached to hinged needle portion 60 might help with finger pressure to move hinged needle portion 60 to its open position as shown in dotted lines in FIG. 3.

Figure 7:
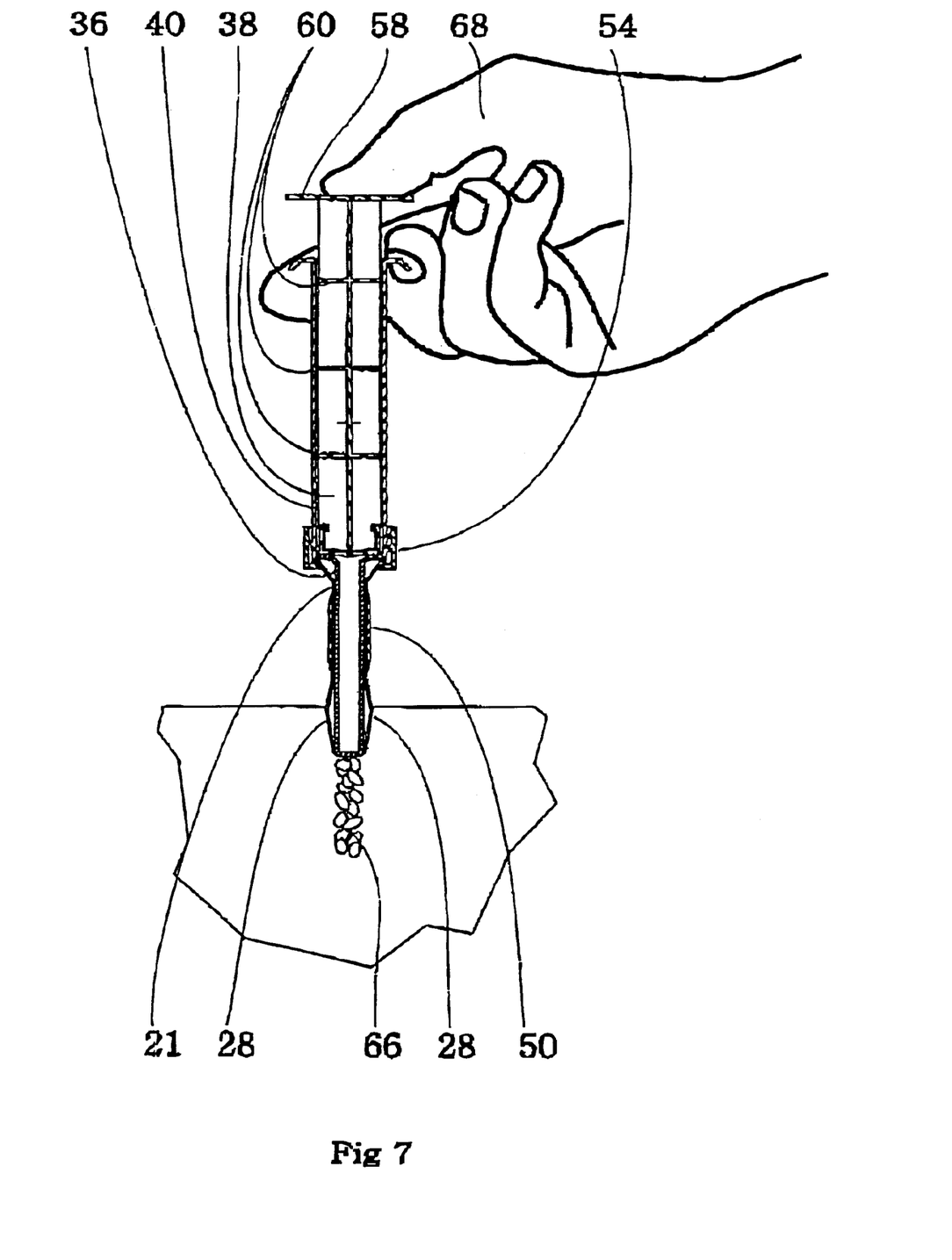
FIG. 7 is the cross-section view of FIG. 1 after solids 66 have been injected.

Operating the embodiment comprises the steps of filling needle 21 or 23 with solids 66 using one of the material loading mechanisms such as just described or an equivalent. Once the embodiment is loaded and any needed reassembly completed, the needle is pierced into the object to be injected, and the power drive mechanism is activated, as an example by manual pressure as described above on intermediate thumb pads 60 and/or on primary thumb pad 58. This causes solids 66 to be expelled from the embodiment as shown in FIG. 7.

The embodiment may be constructed at any scale including: small-scales, appropriate for use in orthopedic surgery or other medical procedures such as implanting solid medicines or objects; intermediate scales such as illustrated in the appended figures for use in food preparation; to larger scales appropriate for inserting solid objects underground or other places.

Likewise, many different materials may be appropriate for use in constructing embodiments of the present inventions. As examples, the embodiment shown may have needles 21 and 23 constructed from pliable plastics such as polypropylene, nylon, polyethylene or polycarbonate. Barrel 40, pusher plunger 38, and needle ring securing might as examples be made from ABS, polycarbonate, polypropylene, acrylic diecast aluminum etc. Medical embodiments of the present inventions might use similar materials or might be constructed from other materials such as stainless steel.

Other features might easily be added to the preferred embodiment such as volumetric measuring markings on the side of needles 21 and 23 or barrel 40. Clear or translucent materials on needles 21 and 23 and barrel 40 might help or be necessary in the use of such markings.

The embodiment may also be used for injecting all viscosity of liquids, including: light viscosity liquids, semi liquids, highly viscous liquids, and liquids containing solids. To accomplish these tolerances between plunger 36 and the inside of the needle 21 or 23 might be adjusted so lighter liquids would be driven out. Also, movable port covers 28 or 30 might have to fit tightly when closed to keep lighter viscosity liquids from escaping before injection.

For all embodiments described herein, many features detailed need not be necessary to practice the present inventions. Likewise, most features described herein can obviously be interchanged between embodiments even where they are not specifically shown.

DETAILED DESCRIPTION OF THE DRAWINGS

Figure 1:
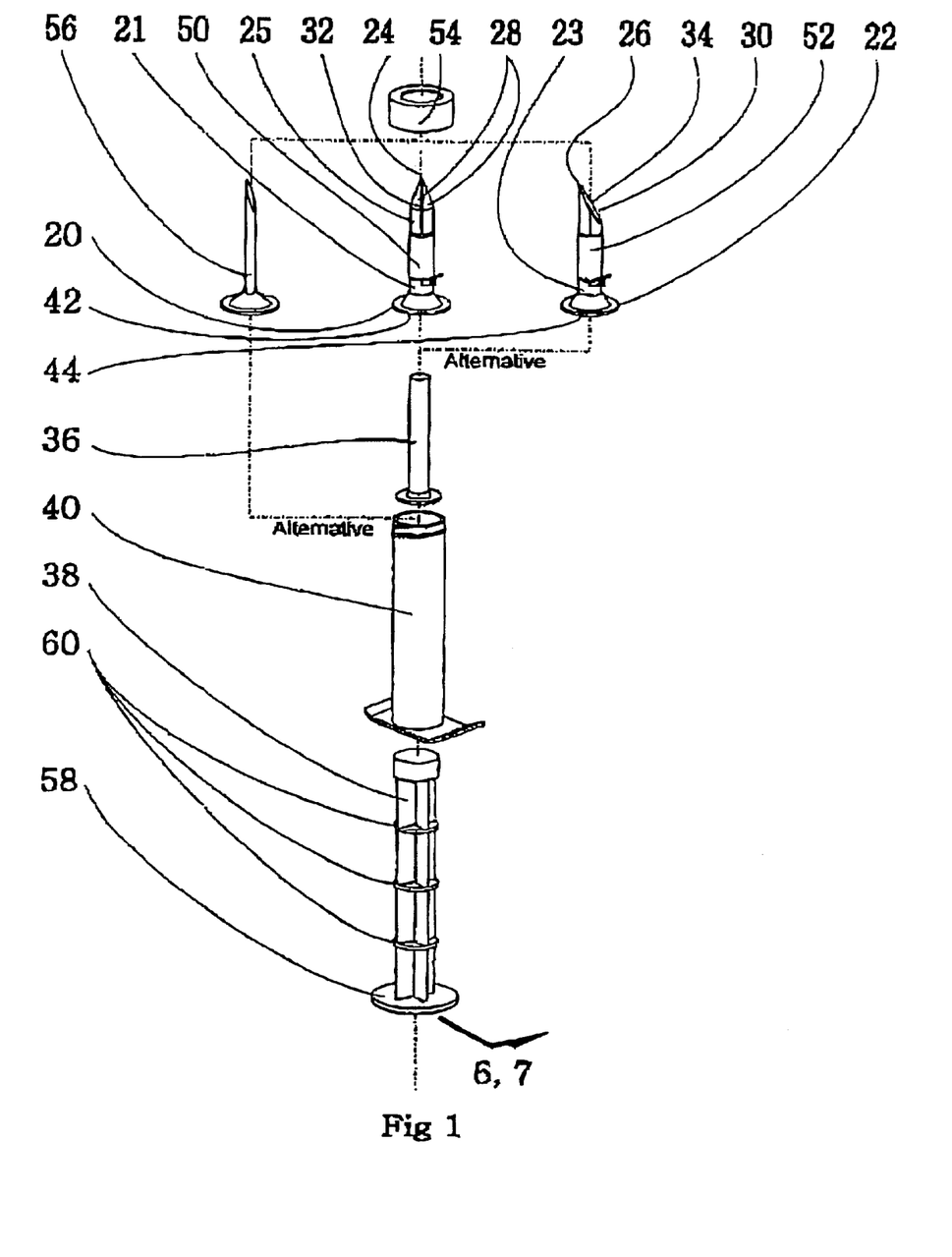
FIG. 1 is an exploded perspective view of an embodiment incorporating the present invention.

As shown in FIG. 1, the present invention utilizes barrel 40, pusher plunger 38 (with modifications described below), and needle securing nut 54 similar to a typical home liquid food injecting syringe. Typical liquid injecting needle 56 is shown to illustrate how it might be interchanged with solid injecting needles 21 and 23. Primary thumb pad 58 and intermediate thumb pads 60 are also shown. As illustrated by the dotted line thumb in FIG. 6, intermediate pads 60 help people with smaller hands press on pusher plunger 38 when it is extended.

Figure 2:
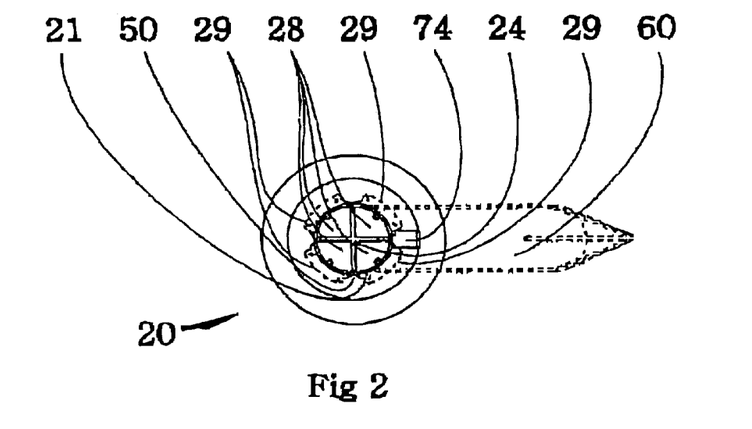
FIG. 2 is an end view of needle 21 taken from penetrating point 24 end of needle 21.

As shown in FIG. 2, four movable port covers 28 are shown in solid line in their closed positions, and in dotted line 29 in their open positions. Also shown in dotted line 60 is hinged needle portion in its open position and in solid line 59 in its closed position.

Needle 21 is indicated as being cylindrical tube 25 terminated on one end by penetrating point 24. Round cross-section cylindrical tube 25 is volumetrically efficient, easy to clean, and offers easy to fit orientation to cylindrical plunger 36 which fits within tube 25.

Other cross-sections than round might also be used however. As examples, elliptical, eye shape, square, egg shape, star shape, etc. cross-sections might also be employed. Depending on the item to be injected, these alternative cross-sections may work and may even provide additional benefits. As an example, an eye shape cross-section may help to close the needle hole after injection.

Penetrating point 24 is shown as the tip of a cone formed from closed movable port covers 28.

Four movable port covers 28 are also indicated in FIG. 2 and FIG. 3. Fewer or more divisions for the port covers could also be used. As examples, 2, 3, 5, 6, 7, etc. regularly or irregularly spaced port covers might replace the four regularly spaced covers shown. All that is necessary is that the port covers restrain materials within needle 21 from falling out before injection and that penetrating point 24 be strong enough to pierce the article to be injected.

Cylindrical plunger 36 laterally slides into and out of needle 21. This may be either a high tolerance or low tolerance fit depending on the coarseness of contents to be injected.

As seen in FIG. 3, movable port covers 28 and the hinged needle portion in its open position 60, as well as ring 50 are all shown in dotted lines. FIG. 2 and FIG. 3 shown how movable port covers 28 deflect to allow solid contents from needle 21 to exit. FIGS. 2 and 3 also show how the hinged needle portion swings out 60 to allow loading of needle 21 by scooping into the contents to be loaded like a spoon or by loading by other means such as hand inserting contents to be injected 66 into open needle 21.

Hinge 72 is indicated as being as molded living hinged such as might be used if needle 21 were molded from polypropylene or other suitable material. Hinged 72 is shown as being biased toward the hinged needle portion being in its open position as indicated by dotted line 60. This bias assists in filling needle 21 by having the needle be naturally open and able to scoop or be filled by hand or other means until needle 21 is closed and ring 50 is fitted onto it.

Figure 4:
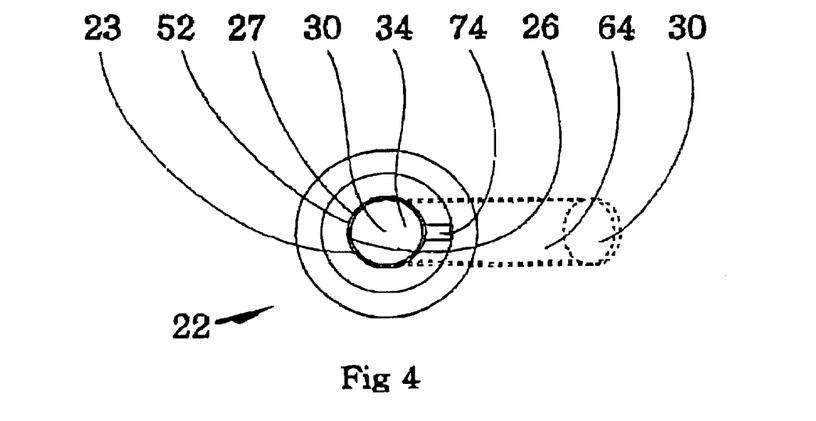
FIG. 4 is an end view of needle 23 taken from penetrating point 26 end of needle 23.

Referring to FIG. 4, shown in dotted line 64 is the hinged needle portion on its open position. Needle 23 is indicated as being cylindrical tube 27 terminated on one end by penetrating point 24 formed by an angled cut across the end of cylindrical tube 27. Like needle 21, cross-sections other than round might be advantageously employed.

Figure 5:
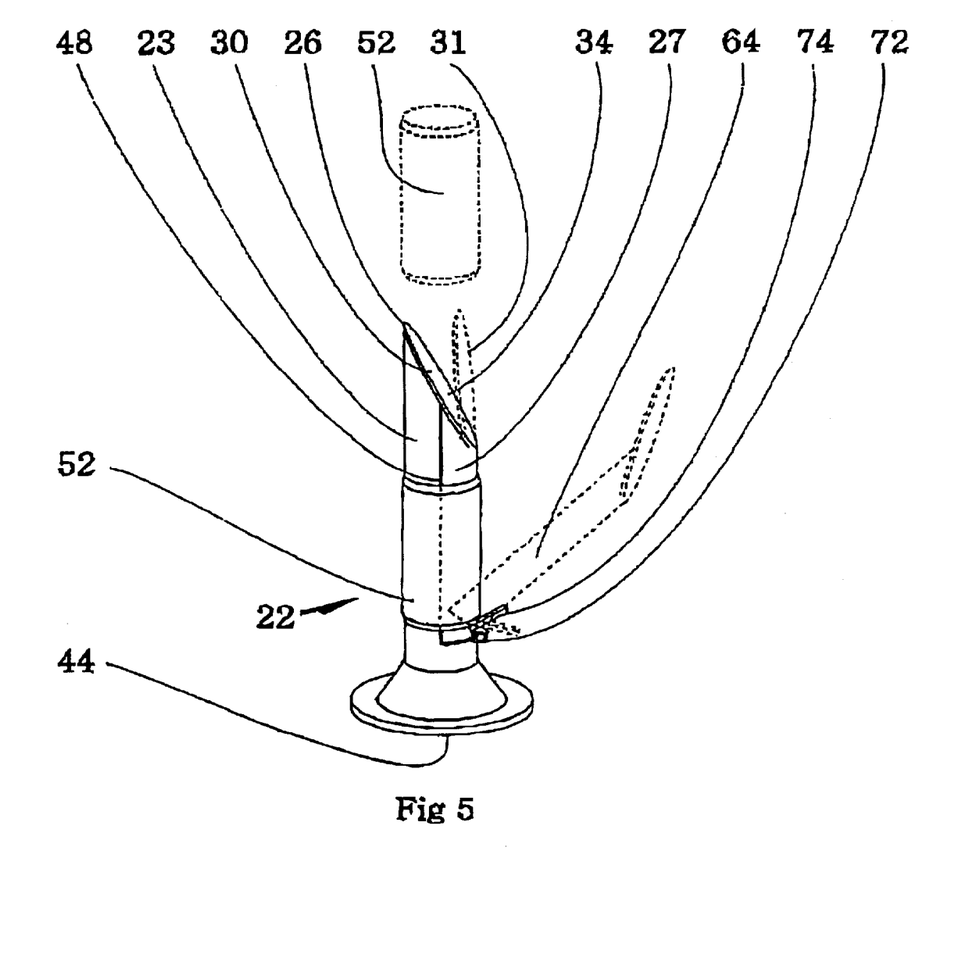
FIG. 5 is a perspective side view of needle 23.
Figure 6:
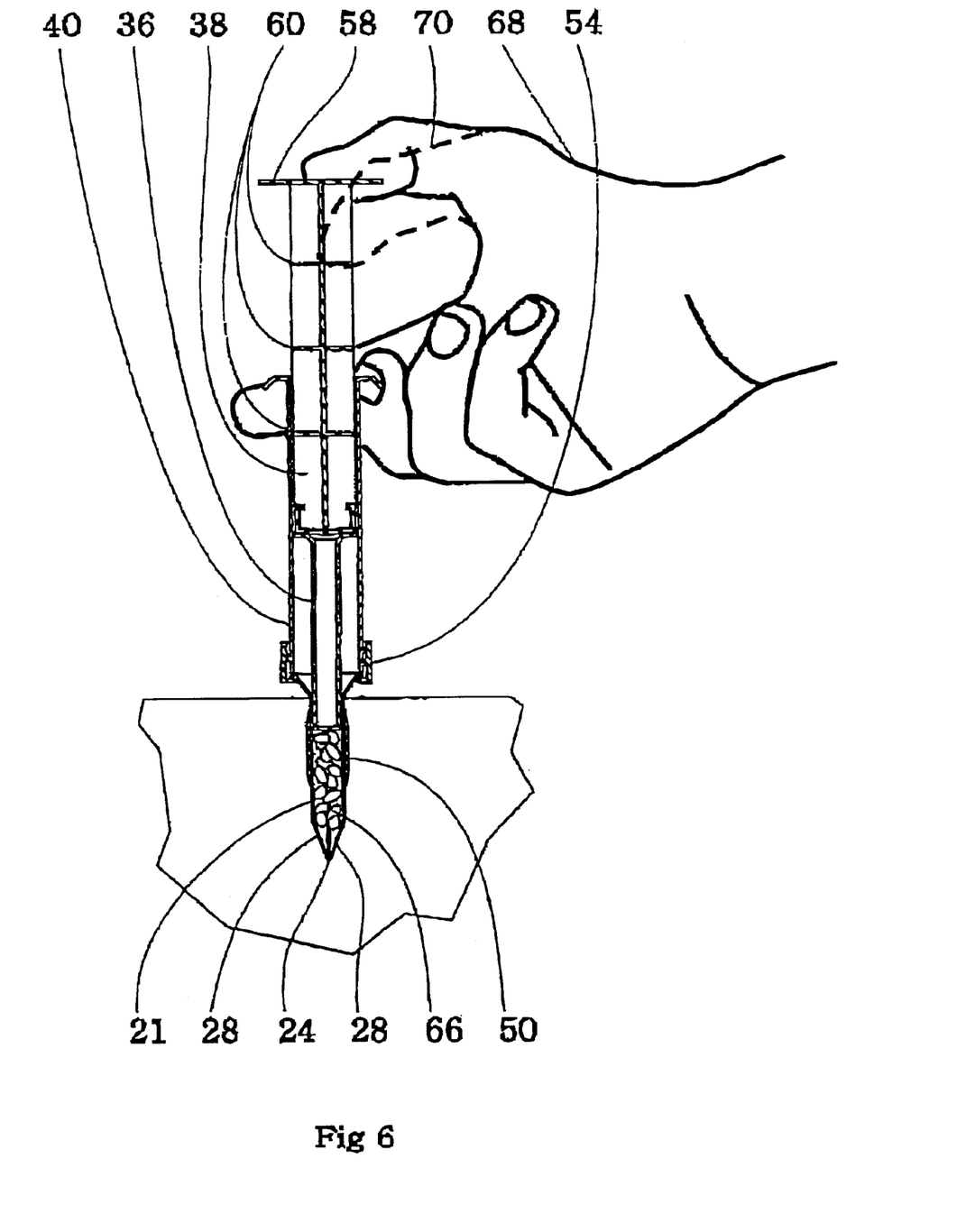
FIG. 6 is a cross-section view of FIG. 1.

As seen in FIG. 5, movable port cover 30 in its open position 31, and hinged needle portion 64, as well as ring 52 are shown in dotted lines. FIG. 4 and FIG. 5 show in dotted line 31 how movable port cover 30 deflects to allow solid contents from needle 23 to exit. FIGS. 4 and 5 also show how hinged needle portion 64 swings out to allow loading of needle 23 by scooping into the contents to be loaded or by loading by other means such as hand inserting solid contents into open needle 23.

FIG. 1 shows the assembled embodiment of FIG. 1 readily injecting solids 66. Hand 68 indicates one example of how the embodiment might be used. Dotted line thumb 70 shows an example of how a person with a smaller hand might operate the embodiment by pressing on disk shaped intermediate thumb pads 60. Intermediate thumb pads 60 are circular ribs disposed orthogonal to the axis of pusher plunger 38. These intermediate pads allow pusher plunger 38 to be pressed down, using one or two hands, without having to reach primary thumb pad 58 on the end of the pusher plunger 38.

FIG. 8 is a perspective view of an alternative embodiment of the present inventions which eliminates the need for pusher plunger 30, barrel 40 and needle ring securing nut 54. Also shown are markings 76 for measuring the amount of material to be injected. To utilize these markings, ring 78 and needle 80 would advantageously be made from clear or translucent material. This embodiment also incorporates intermediate thumb pads 82 to make it easier for people with small hands to use the embodiment similar to intermediate thumb pads 60 on embodiments described herein. Intermediate thumb pads 82 may provide support for two thumbs simultaneously or one thumb to press on plunger 84. Likewise, primary thumb pad 86 may allow one or two hand operation.

FIG. 9 shows a motorized embodiment of the present inventions. Needle 88 does not have certain features of earlier embodiment including splitting 46 needle 88 and having related finger lever 74. For all embodiments described herein, many features detailed need not be necessary to practice the present inventions. Likewise, most features described herein can obviously be interchanged between embodiments even where they are not specifically shown. As an example, needle 88 in FIG. 9 could be split 46 and could also have finger lever 74.

The embodiment shown in FIG. 9 has outer case 90 housing gear reduced motor driven ratchet gear 92 which drives in one direction 94 plunger 96 when plunger 96 is inserted into tubular track 98 and grooves 100 on plunger 96 engage ratchet gear 92, and when also the user presses button switch 102 which activates rotation of ratchet gear 92. Grooves 100 are held in engagement against ratchet gear 92 by pressure on the side of plunger 96 toward ratchet gear 92 from leaf spring 104. Spring 104 assisted ratcheting engagement also allows plunger 96 to be inserted through tubular track 98 in direction 94 with manual pressure without activating rotation of ratchet gear 92.

Needle 88 can be inserted and removed from outer case 90 by sliding needle 88 into and out of slots 106. This may be desirable for cleaning, or use of other needles, or for other purposes.

The embodiment may be operated in a variety of ways. As an example, needle 88 could first be filled with materials to be injected. This could be done in several ways. As an example, before attachment to outer case 90, needle 88 might be filled through its rear and needle 88 then attached to outer case 90. As another example, materials to be injected could be dropped into hopper 108 and gravity fed into needle 88 etc.

Plunger 96 could then be inserted 94 into tubular track 98 and pressed until it blocked the rear entry of needle 88. The user could then pierce the item to be injected with needle 88 and press button switch 102 causing plunger 96 to drive the materials to be injected out of needle 88 and into the item to be injected.

Needle 88 would then be removed from the item to be injected and plunger 96 removed from outer case 90 and needle 88 by plunger 96 being pulled in direction 94 through the tip of needle 88.

What is claimed is:

1. A device to inject solid objects such as peanuts, walnuts, pineapple and lemon chunks, garlic cloves and other solid objects into a food article, the device comprising:
   a first plunger;
   a second plunger which is pushed by the first plunger;
   a first hollow sleeve containing the second plunger;
   the first sleeve configured to receive solid objects and to have the solid objects pushed through the sleeve by the second plunger while the second plunger is being pushed by the first plunger; and
   a penetrating tip disposed on a first end of the first sleeve and configured to both pierce the food article and to pass solid objects from the sleeve through the tip and into the pierced food article.

2. The device of claim 1 wherein the first plunger is pushed by hand against the second plunger to pass the solid objects into the pierced food article.

3. The device of claim 1 further comprising the tip having a moving member configured to retain solid objects within the first sleeve.

4. The device of claim 1 further comprising a second hollow sleeve containing the first plunger and the second hollow sleeve being attached to the first hollow sleeve.

5. The device of claim 4 further comprising the first hollow sleeve together with the second plunger contained within the first hollow sleeve being interchangeable with a liquid conveying tubular needle.

6. The device of claim 1 further comprising the solid objects being received into the first hollow sleeve through a second end of the first hollow sleeve and the second end being opposite the first end.

7. A device to inject solid objects such as peanuts, walnuts, pineapple and lemon chunks, garlic cloves, and other solid objects into foods, the device comprising:
   a first hollow sleeve configured to receive solid objects through a rear end of the sleeve;
   a tip on a front end of the sleeve and the tip having a moving member with a first position to restrain solid objects in the sleeve from exiting the sleeve, the moving member having a second position which allows solid objects to pass through the tip, and the tip is configured to pierce food articles;
   a first plunger configured to fit into the first hollow sleeve through its rear end and to push solid objects through the sleeve and through the tip while the tip is pierced into a food article; and
   activation means to move the first plunger through the first hollow sleeve causing the solid objects to be ejected from the sleeve, through the tip, and into the pierced food article, wherein the activation means includes a second plunger which pushes against the first plunger.

8. The device of claim 7 wherein the activation means is powered by hand.

9. The device of claim 7 further comprising the first hollow sleeve having a generally regular interior bore along the length of its axis, and from time to time the tip having an opening formed in part by the moving member, and the opening being about equal to the cross-section of the interior bore.

10. A device to inject solid objects such as peanuts, walnuts, pineapple and lemon chunks, garlic cloves, and other solid objects into foods, the device comprising:
- a first hollow sleeve configured to receive solid objects through a rear end of the sleeve;
- a tip on a front end of the sleeve and the tip having a moving member with a first position to restrain solid objects in the sleeve from exiting the sleeve, the moving member having a second position which allows solid objects to pass through the tip, and the tip is configured to pierce food articles;
- a first plunger configured to fit into the first hollow sleeve through its rear end and to push solid objects through the sleeve and through the tip while the tip is pierced into a food article;
- activation means to move the first plunger through the first hollow sleeve causing the solid objects to be ejected from the sleeve, through the tip, and into the pierced food article; and
- a motor and the motor powering the activation means.

11. A method of injecting solid objects such as peanuts, walnuts, pineapple and lemon chunks, garlic cloves and other solid objects into food articles using a hollow sleeve with a food piercing tip having a moving member to retain solid objects within the sleeve on its front end, and the method comprising the steps of:
- loading solid objects through the rear end of the hollow sleeve and the solid objects being restrained from exiting the sleeve by the moving member;
- behind the solid objects, placing a first plunger into the hollow sleeve;
- piercing a food article with the food piercing tip;
- moving the first plunger through the sleeve causing the solid objects to push against and deflect the moving member and causing the solid objects to be ejected from the sleeve through the food piercing tip and into the pierced food article; and
- using a second plunger to push and move the first plunger through the hollow sleeve.

12. The method of claim 11 further comprising using hand power to move the first plunger through the hollow sleeve.

* * * * *